(12) United States Patent
Cremerius (10) Patent No.: US 7,857,682 B2
(45) Date of Patent: Dec. 28, 2010

(54) PROCESS OF AND DEVICE FOR MACHINING BALL HUBS

(75) Inventor: Rolf Cremerius, St. Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 1044 days.

(21) Appl. No.: 10/562,650

(22) PCT Filed: Dec. 3, 2004

(86) PCT No.: PCT/EP2004/013794

§ 371 (c)(1),
(2), (4) Date: Apr. 11, 2006

(87) PCT Pub. No.: WO2006/058556

PCT Pub. Date: Jun. 8, 2006

(65) Prior Publication Data

US 2006/0283016 A1 Dec. 21, 2006

(51) Int. Cl.
*B23P 13/04* (2006.01)
(52) U.S. Cl. .......................... 451/51; 464/144; 464/145; 29/898; 29/558
(58) Field of Classification Search ................ 451/51; 464/144, 132, 146, 145; 29/898, 558, 450, 29/441.1, 898.062
See application file for complete search history.

(56) References Cited

U.S. PATENT DOCUMENTS

| | | | | |
|---|---|---|---|---|
| 3,618,191 A | * | 11/1971 | Willimek et al. | ....... 29/898.066 |
| 5,772,494 A | * | 6/1998 | Muraki et al. | .................. 451/52 |
| 5,916,013 A | * | 6/1999 | Naumann et al. | ............. 451/51 |
| 6,044,684 A | | 4/2000 | Ohama et al. | |
| 6,071,195 A | | 6/2000 | Krude | |
| 6,684,500 B1 | | 2/2004 | Kohlhase et al. | |
| 2006/0283016 A1 | * | 12/2006 | Cremerius | ................... 29/898 |
| 2007/0104550 A1 | * | 5/2007 | Cremerius | .................. 409/132 |

FOREIGN PATENT DOCUMENTS

| DE | 19947588 | 7/2001 |
|---|---|---|
| DE | 103 18 408 A1 | 11/2004 |
| WO | WO 99/30051 | 6/1999 |
| WO | WO 02/08624 A1 | 1/2002 |

\* cited by examiner

*Primary Examiner*—Lee D Wilson
(74) *Attorney, Agent, or Firm*—Rader, Fishman & Grauer PLLC (57) ABSTRACT

A process machining inner joint parts (11) of constant velocity universal ball joints, which inner joint parts (11) comprise a longitudinal axis (A) and at least one guiding face by which the inner joint part (11) is continuously angularly movably guided in a ball cage, and which comprise a plurality of ball tracks (12) which are distributed around the circumference of the guiding face and which divide the guiding face into a corresponding plurality of guiding webs (13) and in which torque transmitting balls can be held so as to be longitudinally displaceable. One ball track (12) and at least one guiding web (13) are machined simultaneously.

15 Claims, 8 Drawing Sheets

PROCESS OF AND DEVICE FOR MACHINING BALL HUBS

TECHNICAL FIELD

The invention relates to processes of and devices for machining the inner joint parts of constant velocity universal ball joints, which inner joint parts are also referred to as ball hubs.

BACKGROUND

Such inner joint parts have a longitudinal axis A and comprise at least one guiding face by means of which the inner joint part is continuously angularly movably guided relative to the ball cage. On said guiding face there is positioned a plurality of circumferentially distributed ball tracks which divide the guiding face into a corresponding plurality of guiding webs. Torque transmitting balls of the constant velocity universal ball joint can be longitudinally displaceably held in the ball tracks. As is generally known, constant velocity universal ball joints of this type comprise an outer joint part with first ball tracks, a ball cage holding a plurality of balls, as well as the inner joint part which is referred to here and which has second ball tracks (not explained in greater detail below). More particularly, but not exclusively, the inner joint parts of the above-described type are suitable for constant velocity universal ball joints which are referred to by the applicant as AC (angular contact), UF (undercut free), DO (double offset), HAI (high angle inboard) and TBJ (twin ball joint) joints. These designations have largely developed into standard terms referring to species.

When producing prior art inner joint parts it is already known to subject the workpieces and a common clamping device first to machining operations on the individual ball tracks and subsequently to machining operations on the guiding webs. When machining the ball tracks, the ball hub is held in position and by means of rotating tools, the ball tracks are machine track by track in a chip-forming way. More particularly, the already hardest tracks are ground. Thereafter, the ball hub, in a rotatingly driven condition, is finished-turned (on outer diameter) and then form-ground.

SUMMARY OF THE INVENTION

It is an object of the present invention to further optimize the process of producing ball hubs of said type and to provide devices for carrying out said process.

A first solution provides a process of machining the inner joint parts of constant velocity universal joints, which inner joint parts have a longitudinal axis A and comprise at least one guiding face by which the inner joint part is continuously angularly movably guided in a the ball cage, and which comprises a plurality of ball tracks which are distributed around the circumference of the guiding face, which divide the guiding face into a corresponding plurality of guiding webs and in which the torque transmitting bails can be held so as to be longitudinally displaceable. The inner joint part has at least one ball track and at least one guiding web which are machined in a chip-forming way simultaneously.

With set-up times which are as advantageous as those used so far, i.e. by using a clamping device, the inventive process is suitable for shortening the machining times and for considerably reducing the down-times of the individual tools. Said chip-forming machining operation can comprise both milling processes and grinding processes as well a combination of the two. With a given output the investment costs are reduced considerably by the inventive process.

More particularly while adhering to the further embodiments mentioned below, it is possible to achieve quality improvements, i.e. that in the case of uneven numbers of ball tracks and guiding webs, one ball track and one radially opposed guiding web are machined simultaneously. In the case of even numbers of ball tracks and guiding webs, one ball track and one guiding web adjoining the radially opposed ball track are machined simultaneously. In this way, either no transverse forces or only low transverse forces are applied to the clamping device for the workpiece, so that the tracks and guiding webs can be produced with a higher degree of precision. Because the rotating tools used are form tools, tracks of any cross-section can be produced.

Production can be increased further in that two ball tracks and two faces are machined simultaneously or that at least two—more particularly two ball tracks positioned in planes extending parallel relative to one another—are simultaneously machined in the longitudinal direction synchronously and, with one or two guiding webs being machined at least partially simultaneously thereto.

According to a second solution which substantially has the same advantages as the above-described solution, there is provided a process of machining inner joint parts of constant velocity universal ball joints, which inner joint parts have a longitudinal axis and comprise at least one guiding face by which the inner joint part is continuously angularly movably guided in a the ball cage, and which comprises a plurality of ball tracks which are distributed around the circumference of the guiding face, which divide the guiding face into a corresponding plurality of guiding webs and in A which the torque transmitting balls can be held so as to be longitudinally displaceable. At least two ball tracks are machined simultaneously in a chip-forming way in the longitudinal direction.

Finally, according to a third solution which also has the same advantages as described above, there is provided a process of machining inner joint parts of constant velocity universal ball joints, which inner joint parts have a longitudinal axis and comprise at least one guiding face by means of which the inner joint part is continuously angularly movably guided in a ball cage, and which comprises a plurality of ball tracks which are distributed around the circumference of the guiding face, which divide the guiding face into a corresponding plurality of guiding webs and in which the torque transmitting balls can be held so as to be longitudinally displaceable. At least two guiding tracks are machined simultaneously in a chip-forming way in the longitudinal direction.

With the processes mentioned here it is also possible to achieve an improvement in quality in that with uneven numbers of ball tracks and guiding webs, a first ball track or web face and the second ball track or guiding web adjoining the radially opposed partial face or ball track are machined simultaneously and that with even numbers of ball tracks and guiding webs, two radially opposed ball tracks or guiding webs are machined simultaneously. In this case, too, the forces acting on the workpiece can be largely balanced, so that the transverse forces and bearing load at the clamping device are reduced, with the production accuracy being increased.

According to a one embodiment of the process which will be explained in more detail with reference to the drawings, the ball tracks are machined by rotating tools whose axes of rotation intersect the longitudinal axis of the inner joint part perpendicularly and whose center is guided in radial planes which, relative to the inner joint part, extend through the longitudinal axis.

Alternatively, it is possible for the ball tracks to be machined by rotating tools whose axes of rotation are aligned substantially radially relative to the longitudinal axis of the inner joint part, wherein the axis of rotation, relatively, is guided in radial planes extending through the longitudinal axis of the inner joint part.

With reference to the production of the guiding webs, the guiding webs machined by rotating tools whose axis of rotation intersects the longitudinal axis of the inner joint part perpendicularly and whose center, relative to the inner joint part, is guided in radial planes which extend through the longitudinal axis of the inner joint part because in view of the hollow shape of the tool face, only disc tools can be used and not finger tools. In order to make it possible for several guiding webs to be machined by one tool without having to rotate the clamped-in workpiece, according to a further supplementary process, the guiding webs are machined by rotating tools, whose center, relative to the inner joint part, additionally carries out pivot movements around its longitudinal axis.

In accordance with an objective of the invention, according to a first embodiment, a device for machining inner joint parts of constant velocity universal ball joints is provided. The inner joint parts have a longitudinal axis and comprise at least one guiding face by which the inner joint part is continuously angularly movably guided in a ball cage, and which comprises a plurality of ball tracks which are distributed around the circumference of the guiding face, which divide the guiding face into a corresponding plurality of guiding webs and in which the torque transmitting balls can be held so as to be longitudinally displaceable. The device comprises a clamping device for the inner joint part and at least two rotating tools for simultaneously machining at least one ball track and at least one guiding web in the longitudinal direction.

According to a second solution variant which substantially leads to the same results, the invention comprises a device of the above-mentioned species which comprises a clamping device for an inner joint part and at least two rotating tools for simultaneously machining at least two ball tracks in the longitudinal direction.

According to a further solution variant which also leads to said advantageous results, there is provided a device which comprises a clamping device for an inner joint part and at least two rotating tools for simultaneously machining at least two guiding webs in the longitudinal direction.

Due to the fact that it is possible to machine simultaneously a plurality of functional faces of the inventive inner joint part, productivity is improved with existing investment costs. The device can be particularly simple in design and cost-effective if the clamping device for an inner joint part comprises a feeding mechanism at least for feeding the workpiece in the longitudinal direction of the inner joint part and if the at least two rotating tools comprise a feeding mechanism to ensure feeding in the radial direction only relative to the longitudinal axis of the inner joint part. In addition, the clamping device can additionally comprise an adjusting mechanism for rotatingly adjusting the clamping device around the longitudinal axis of the inner joint part. More particularly, the clamping device is able to clamp in the inner joint part axially.

After the rotating tools have been returned radially outwardly, the workpiece can be rotated in its clamping device by the pitch angle of the ball tracks and the next synchronous machining operation for two functional faces can be repeated with the workpiece being fed in entirely axially and with the rotating tools being moved forward entirely radially. It is also possible to provide an alternative adjusting mechanism for rotatingly adjusting the rotating tools around the longitudinal axis of the inner joint part.

In one embodiment, the axes of rotation of all rotating tools participating simultaneously in the machining operation are positioned in one plane.

According to a further embodiment, the axes of rotation of the rotating tools are positioned in at least two planes extending parallel relative to one another, wherein the toots for dressing the guiding webs are positioned in a second common plane. In this way, it is possible, with simple means, with the clamping device remaining unchanged. It would not be possible for such further tools to be accommodated in an annular assembly in one plane with reference to the longitudinal axis of the workpiece.

As already indicated, the rotating tools for the ball tracks can be disc tools whose axes of rotation intersect the longitudinal axis of the inner joint part at a distance. However, the rotating tools for the ball tracks can also be finger tools which axes of rotation are arranged substantially radially relative to the longitudinal axis of the inner joint part. As far as the rotating tools for the web faces are concerned, these should be provided in the form of disc tools.

BRIEF DESCRIPTION OF THE DRAWINGS

Illustrations of preferred embodiments of the inventive process from which there are derived preferred embodiments of inventive devices are contained in the drawings and will be described below.

FIG. 1 shows an inventive process wherein a ball track and a web face are machined simultaneously:
A) in an axial view of the longitudinal axis of the inner joint part;
B) in a radial view of the longitudinal axis of the inner joint part in a first variant;
C) in a radial view of the longitudinal axis of the inner joint part in a second variant; and
D) in a radial view of the longitudinal axis of a deviating inner joint part.

DETAILED DESCRIPTION OF THE DRAWINGS

Figure 1A:
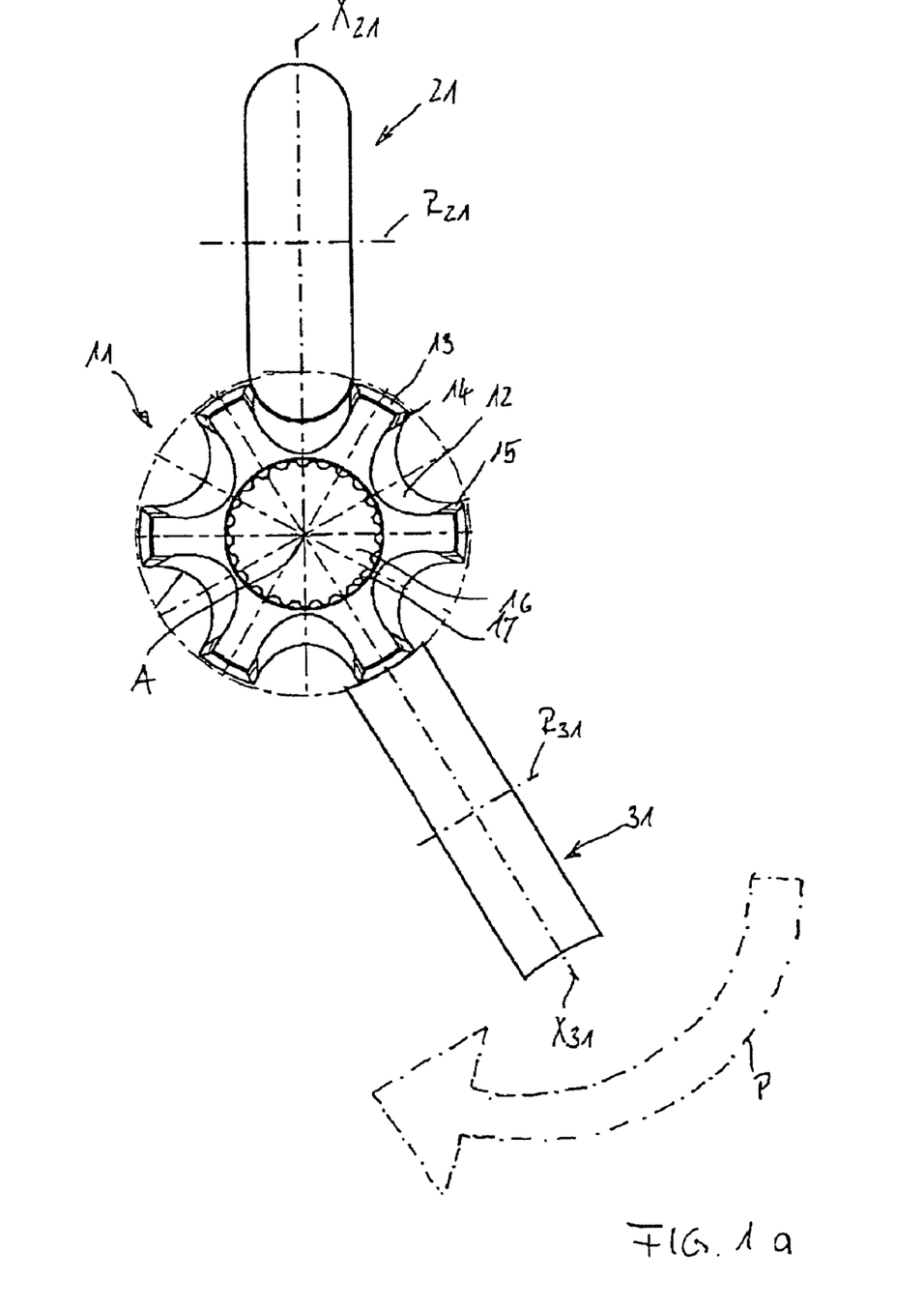

FIG. 1A shows an inventive process of machining an inner joint part 11 of a constant velocity universal joint according to a first solution. The inner joint parts of constant velocity universal joints are often also referred to as ball hubs. The longitudinal axis of the inner joint part 11 has been given the reference symbol A and, below, will repeatedly be used with reference to the arrangement and to the movements of the tools used. The inner joint part 11 is shown to comprise six circumferentially distributed ball tracks 12 which, in the longitudinal direction, comprise a substantially uniform cross-section and which are shown here as approximately semi-circular round tracks. The ball tracks 12 are separated from one another by web faces 13 which are partial faces of an imaginary partially spherical guiding face of the inner joint part by which the inner joint part 11 is guided so as to be articulalable relative to a ball cage. It is common practice for said guiding face to be a disc portion of a ball. However, the guiding face can also be interrupted by a central over-turning, so that, as an imaginary guiding face, it forms two axially spaced ball discs between which there is positioned a non-guiding intermediate portion. At the guiding webs 13 and at the delimiting edges of the ball tracks 12 it is possible to identify chamfers 14, 15 which are irrelevant for the inventive production process. The inner joint part 11 comprises a through-aperture 16 which extends coaxially relative to the longitudinal axis A and comprises inner shaft teeth 17 which are provided for inserting a drive shaft journal. There are provided a first rotating tool 21 constituting a form tool for rotatingly machining the ball tracks 12 as well as a second rotating tool 31 constituting a rotating form tool for machining the guiding webs 13, which rotating tools 21, 31, in accordance with the invention, engage the inner joint part simultaneously. The axis of rotation of the tools 21 has been given the reference symbol $R_{21}$ and the axis of rotation of the tool 31 has been given the reference symbol $R_{31}$. The two axes $X_{21}$ and $X_{31}$ which intersect the longitudinal axis A in the same point and whose significance will be referred to in connection with the following figure each extend perpendicularly relative to the direction of the longitudinal axis A. An arch-shaped arrow P shown in dash-dotted lines indicates the possibility of adjusting the tools 21, 31 relative to the inner joint part 11, with the center of movement being positioned on the longitudinal axis A. However, said possibility of movement constitutes one option only. Alternatively, a holding element for the inner joint part 11 can be designed so as to be rotatingly adjustable.

Figure 1B:
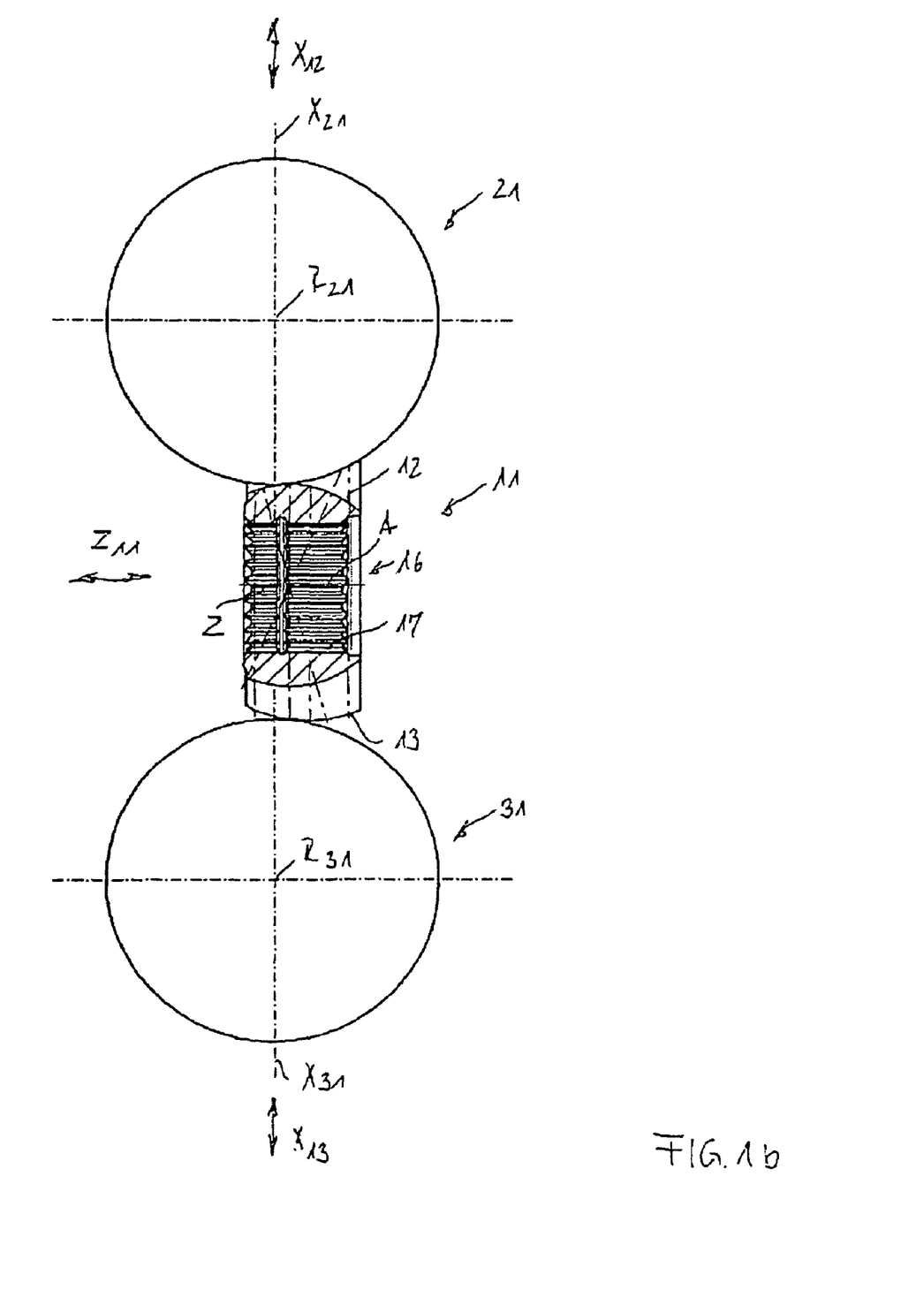
Figure 1C:
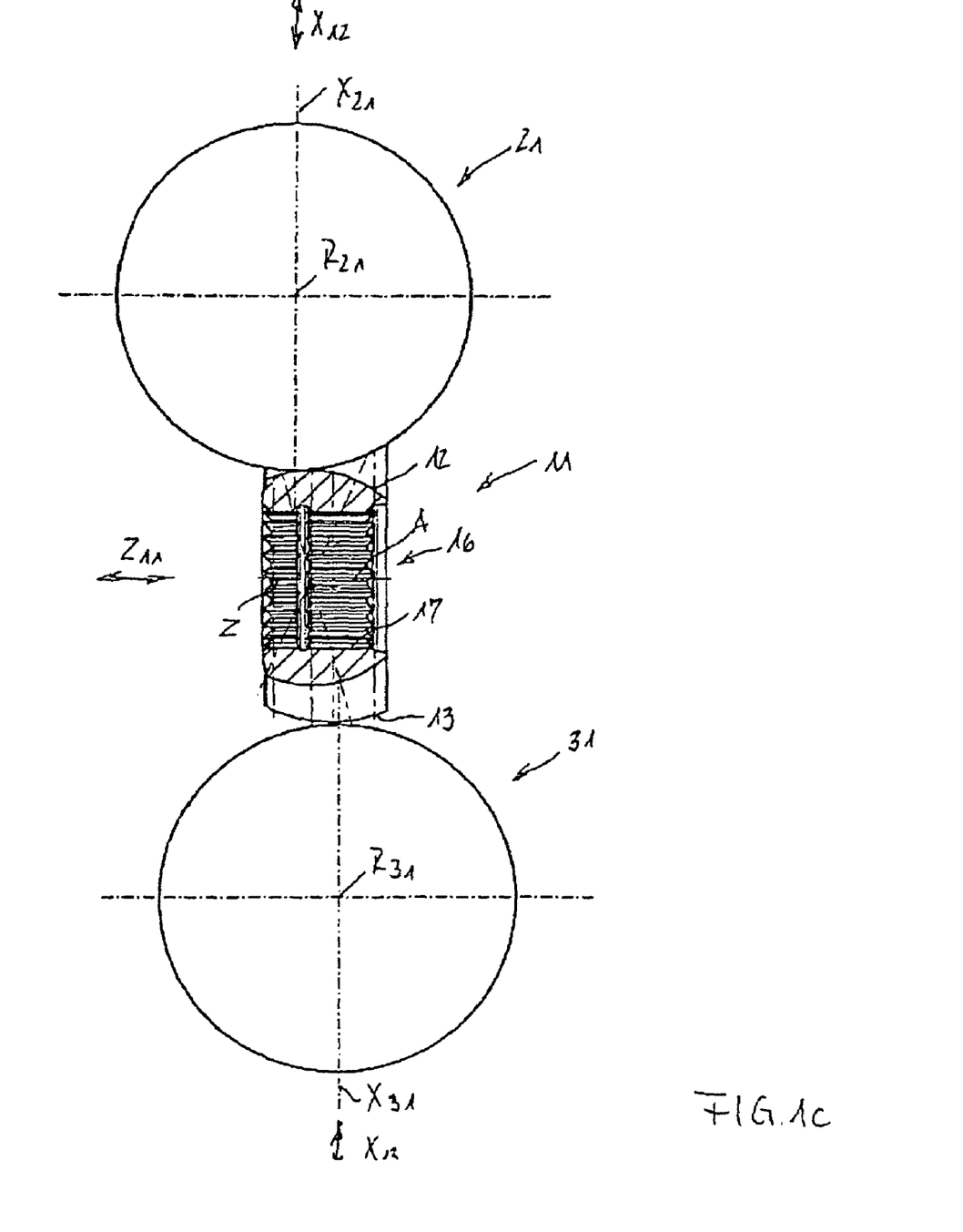

FIGS. 1B and 1C show the process and the device according to FIG. 1A in an angled longitudinal section through the axis A and the axes $X_{21}$, $X_{31}$. The inner joint part 11 is shown to comprise an aperture 16 which extends coaxially relative to the longitudinal axis A and comprises inner teeth 17. One of the ball tracks 12 is shown to engage the rotating tool 21. One of the web faces 13 is shown to engage the rotating tool 31. The movement of the tools 21, 31 relative to the inner joint part 11 is such that the inner joint part 11 is moved entirely axially on the clamping axis Z in the direction of the double arrow $Z_{11}$, whereas the rotating tools 21, 31 are each moved entirely in the direction of the double arrows $X_{12}$, $X_{13}$ along the axes $X_{21}$, $X_{31}$. The axes $X_{21}$, $X_{31}$ are positioned in a common plane which extends radially relative to the clamping axis Z; according to FIG. 1b they coincide and according to FIG. 1c they are offset in parallel relative to one another. In order to change over to machining a further ball track and a further web face after a ball track 12 and a web face 13 have been fully machined simultaneously, the tools 21, 31 can be moved out of the engagement with the inner joint part 11 radially relative to the clamping axis Z, and the inner joint part 11 can be rotated around the clamping axis Z by a pitch angle of the ball tracks 12. The necessary types of movement and control of the device are thus the rotation of the clamping device and the displacement of the clamping device in direction Z as well as an entirely axial displacement of the axes of rotation $R_{21}$, $R_{31}$, along the radial axes $X_{21}$, $X_{31}$.

Figure 1D:
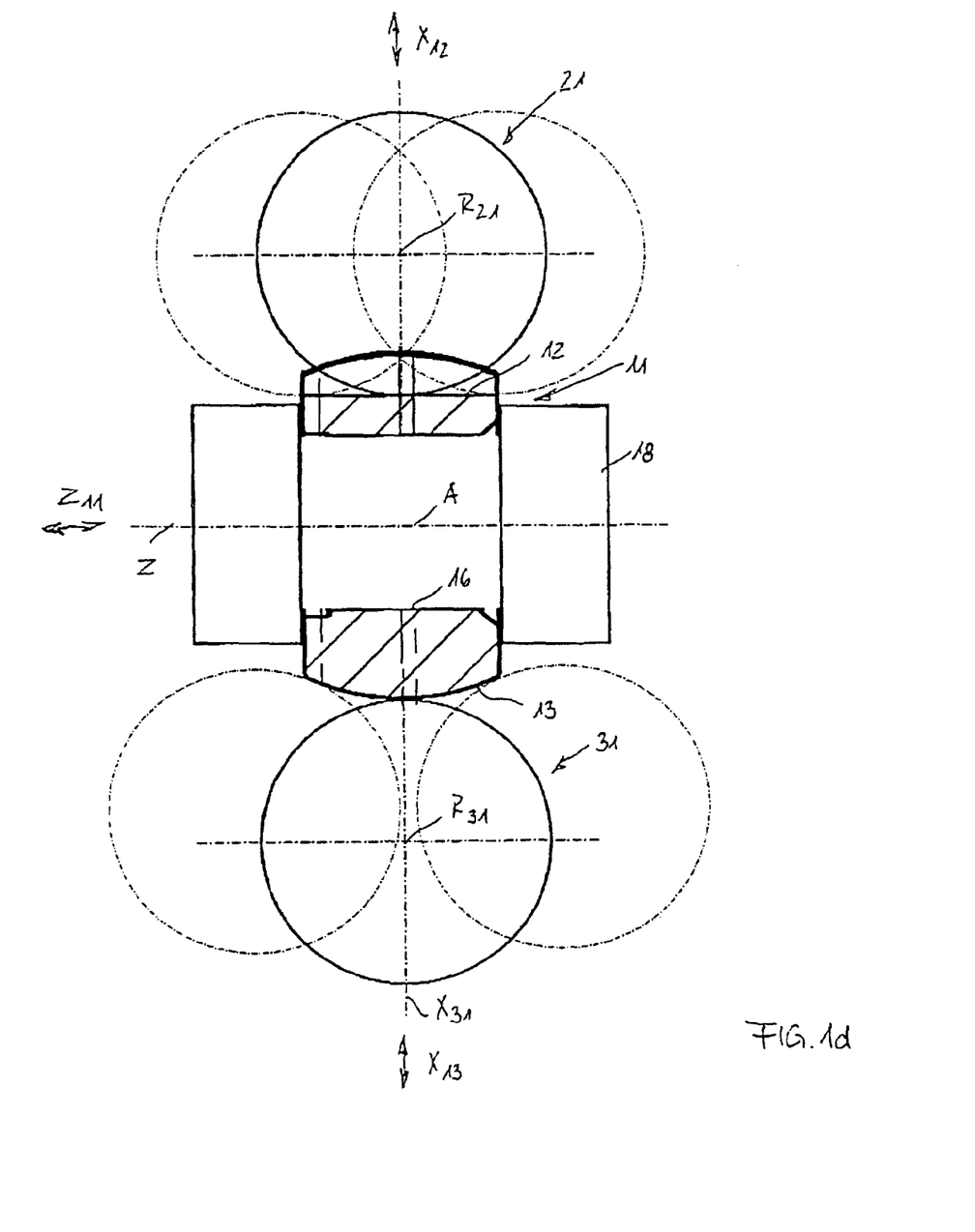

FIG. 1D shows a process and a device similar to those shown in FIG. 1A for a deviating inner joint part 11 in an angled longitudinal section through the axis A and the axes $X_{21}$, $X_{31}$. The inner joint part 11 is axially clamped into a two-part clamping device 18. The inner joint part 11 can be seen to comprise a through-aperture 16 extending coaxially relative to the longitudinal axis A. One of the straight ball tracks 12 engages the rotating tool 21. One of the web faces 13 engages the rotating tool 31. The path of the tools 21, 13 relative to the inner joint part 11 has been indicated by dash-dotted lines. The actual movement, however, is such that the inner joint part 11 is moved on the clamping axis Z entirely axially in the direction of the double arrow $Z_{11}$ whereas the rotational tools 21, 13 are moved entirely in the direction of the double arrows $X_{12}$, $X_{13}$ along the axes $X_{21}$, $X_{31}$, the former operation being only for setting purposes and the latter operation taking place during the entire process. The axes $X_{21}$, $X_{31}$ are positioned in a common plane extending radially relative to the clamping axis Z. In order to change over to machining a further ball track and a further web face after a ball track 12 and a web face 13 have been fully machined simultaneously, the tools 21, 31 can be moved out of the engagement with the inner joint part 11 radially relative to the clamping axis Z, and the inner joint part 11 can be rotated around the clamping axis Z by a pitch angle of the ball tracks 12. The necessary types of movement and control of the device are thus the rotation of the clamping device 18 and the displacement of the clamping device 18 in direction Z as well as an entirely radial displacement of the axes of rotation $R_{21}$, $R_{31}$ along the radial axes $X_{21}$, $X_{31}$.

As can be seen in FIG. 1A, it is advantageous if, for the purpose of balancing the forces, the two tools 21, 31 are arranged largely radially opposite one another. With the even number of ball tracks 12 shown here, it is necessary to deviate from said ideal by half a pitch angle of the ball tracks.

If the chip-forming machining process requires several successive stages such as milling and grinding, further sets of pairs of tools can be arranged in planes extending parallel to the drawing plane of FIG. 1A, so that the inner joint part 11, without having to be re-clamped and while using the entirely axial feeding facilities can be fed to the further set(s) of tools. These sets of tools, too, require only one axial feeding facility in the radial direction with reference to the clamping axis Z.

Figure 2:
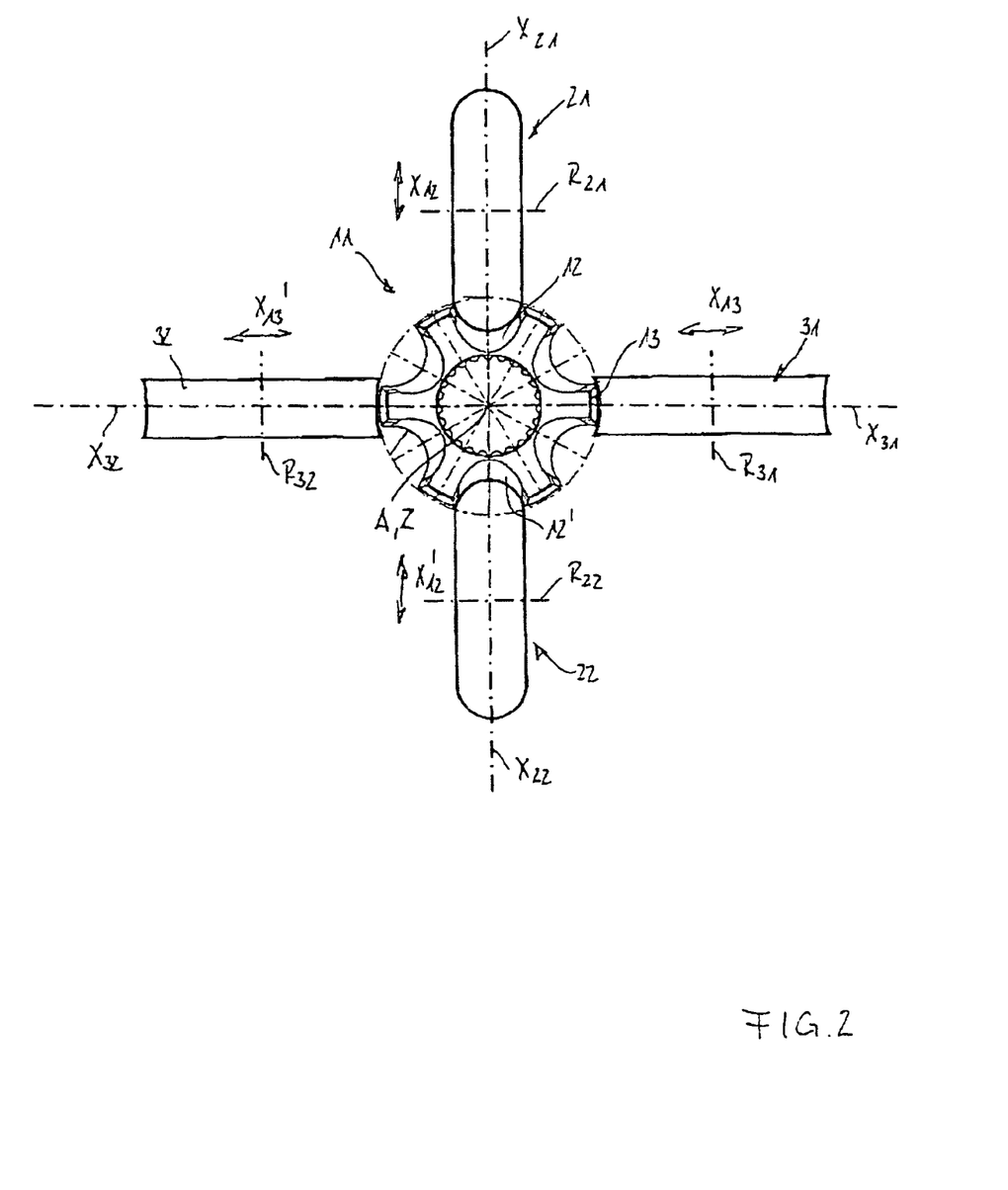
FIG. 2 shows an inventive process wherein two ball tracks and two web faces are machined simultaneously, in an axial view of the longitudinal axis of the inner joint part.

FIG. 2 shows a modified and further embodiment of the process illustrated in FIG. 1, again in an axial view of the longitudinal axis A of the inner joint part 11 analogously to FIG. 1A. Identical details have been given the same reference numbers as in FIG. 1, so that reference is made to the description of same. In addition to the rotating tool 21 for the ball track 12, there is shown a deviating second tool 22 for a ball track 12' positioned radially opposite. Furthermore, in addition to the tool 31 for the web region 13, there is illustrated a further identical tool 32 for a web 13' positioned radially opposite. The axes $X_{21}$, $X_{31}$ form a 90° angle, so that at the inner joint part 11, during the chip-forming machining operation, the forces are largely balanced with reference to the clamping axis Z, i.e. in contrast to the embodiment according to FIG. 1, no resulting forces act on the clamping axis Z. In this case, the device is preferably designed in such a way that the inner joint part 11 is displaceable along the clamping axis Z and, for the purpose of changing between the individual machining operations, it can be rotated around the clamping axis, whereas the tools 21, 22, 31, 32 can only be moved in the direction of the individual axes $X_{21}$, $X_{22}$, $X_{31}$, $X_{32}$.

Figure 3:
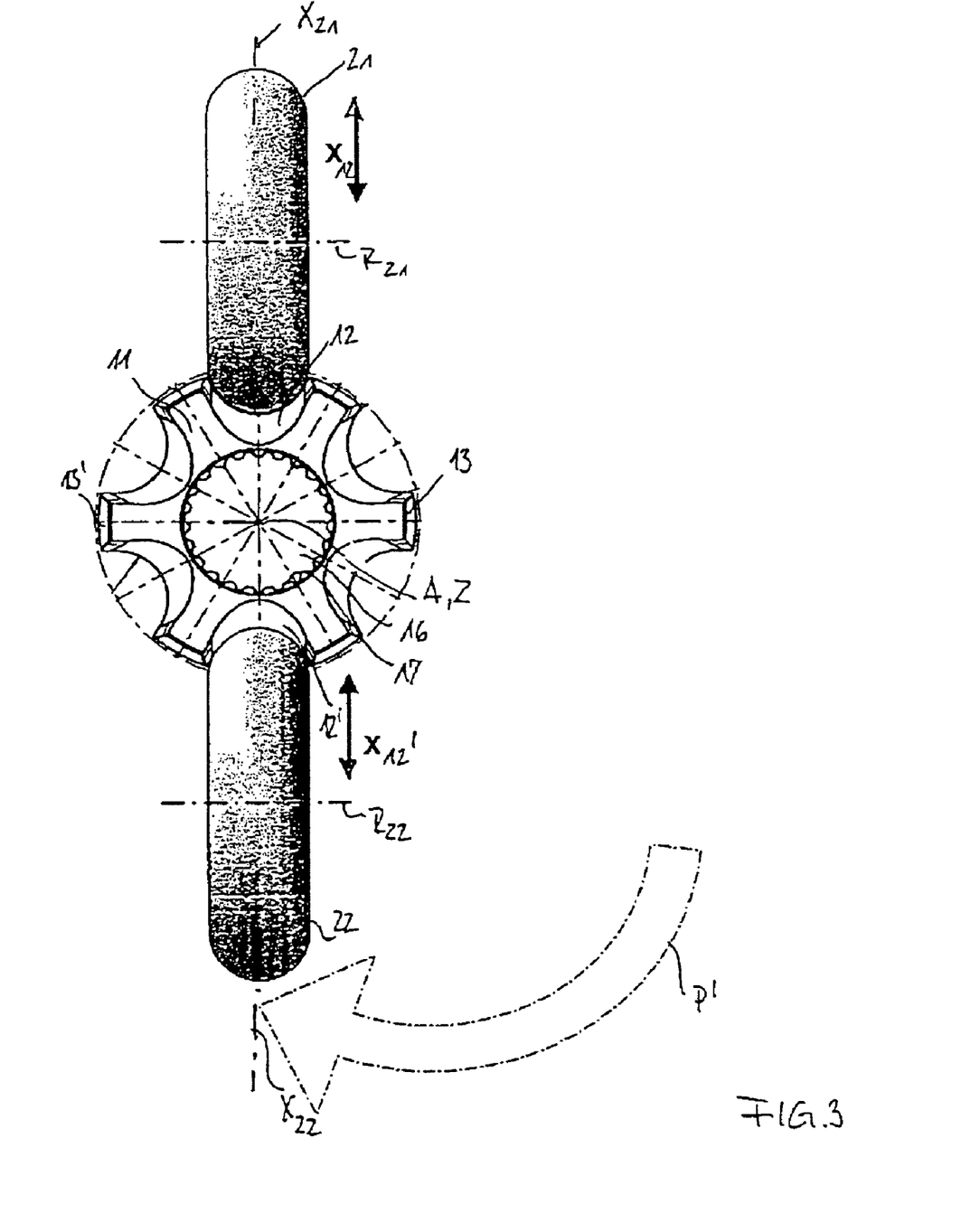
FIG. 3 shows the execution of an inventive process wherein two ball tracks are machined simultaneously, in an axial view of the longitudinal axis of the inner joint part.

FIG. 3 shows the inventive machining process according to a third solution, again illustrating an inner joint part 11 in an axial view of the longitudinal axis A. Identical details have been given the same reference numbers as in the preceding figures, so that reference is made to the description of same. In accordance with the invention, two ball tracks 12, 12' are subjected to a chip-forming machining operation simultaneously by two rotating tools 21, 22 which correspond to those shown in FIG. 2 and, in the same way, engage radially opposed ball tracks. In this case, too, an axial feeding operation takes place along the longitudinal axis A of the inner joint part 11 along the clamping axis Z and, in addition, the inner joint part 11 is rotatable around the axis Z by the track pitch angle (a). In contrast hereto, the axes of the rotatingly driven tools 21, 22 can move in the direction of the double arrows $X_{12}$, $X_{12'}$ in the radial direction relative to the clamping axis Z. Their axes of movement $X_{21}$, $X_{22}$ are positioned in a common plane, i.e. more particularly on a common straight line. In accordance with the arrow P' shown in dash-dotted lines, it is possible, in this case, too, to allow the tools 21, 22 to be adjustable relative to the inner joint part 11 around the center of movement A.

Figure 4:
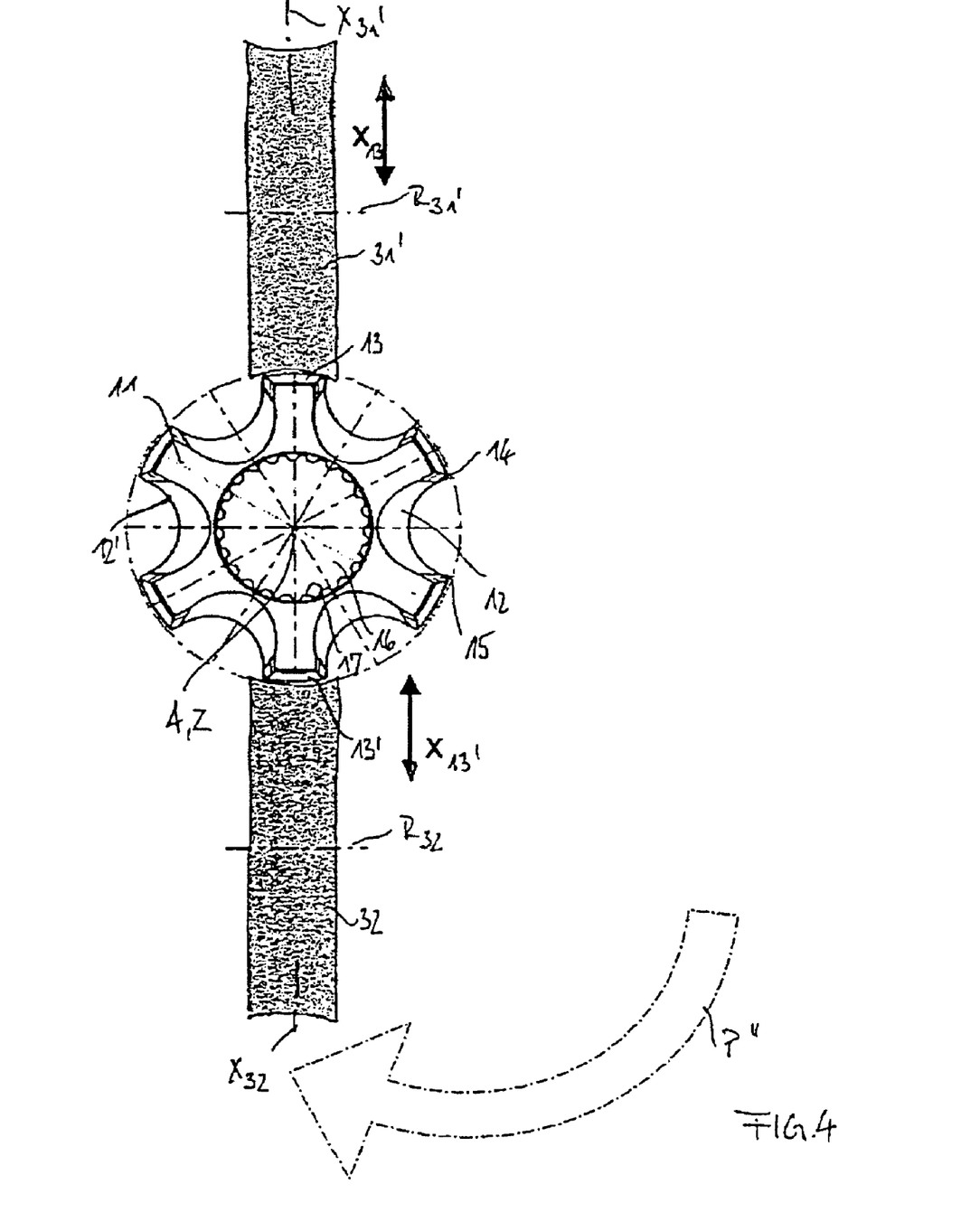
FIG. 4 shows the execution of an inventive process wherein two web faces are machined simultaneously, in an axial view of the longitudinal axis of the inner joint part.

FIG. 4 shows an inventive machining process according to a fourth solution, again showing the inner joint part 11 in an axial view of the longitudinal axis. Identical details have been given the same reference numbers as the preceding figures, so that reference is made to the description of same. In accordance with the invention, two web regions 13, 13' are machined simultaneously by two rotating tools 31', 32 which correspond to those shown in FIG. 2 and which, in the same way, engage radially opposed ball tracks. In this case, too, the longitudinal axis A of the inner joint part is fed forward along the clamping axis Z and, in addition, the inner joint part is rotatable around the axis Z by the track pitch angle (a). On the other hand, the rotatingly driven tools 31', 32 can move their axes only in the direction of the double arrows $X_{13}$, $X_{13'}$ in the radial direction relative to the clamping axis Z. Their axes of movement $X_{32'}$, $X_{32}$ are positioned in a common plane, i.e. more particularly on a common straight line. In accordance with the dash-dotted arrow P''', this case, too, allows the tools 31',32 to be adjustable relative to the inner joint part 11 around the center of movement A.

Figure 5:
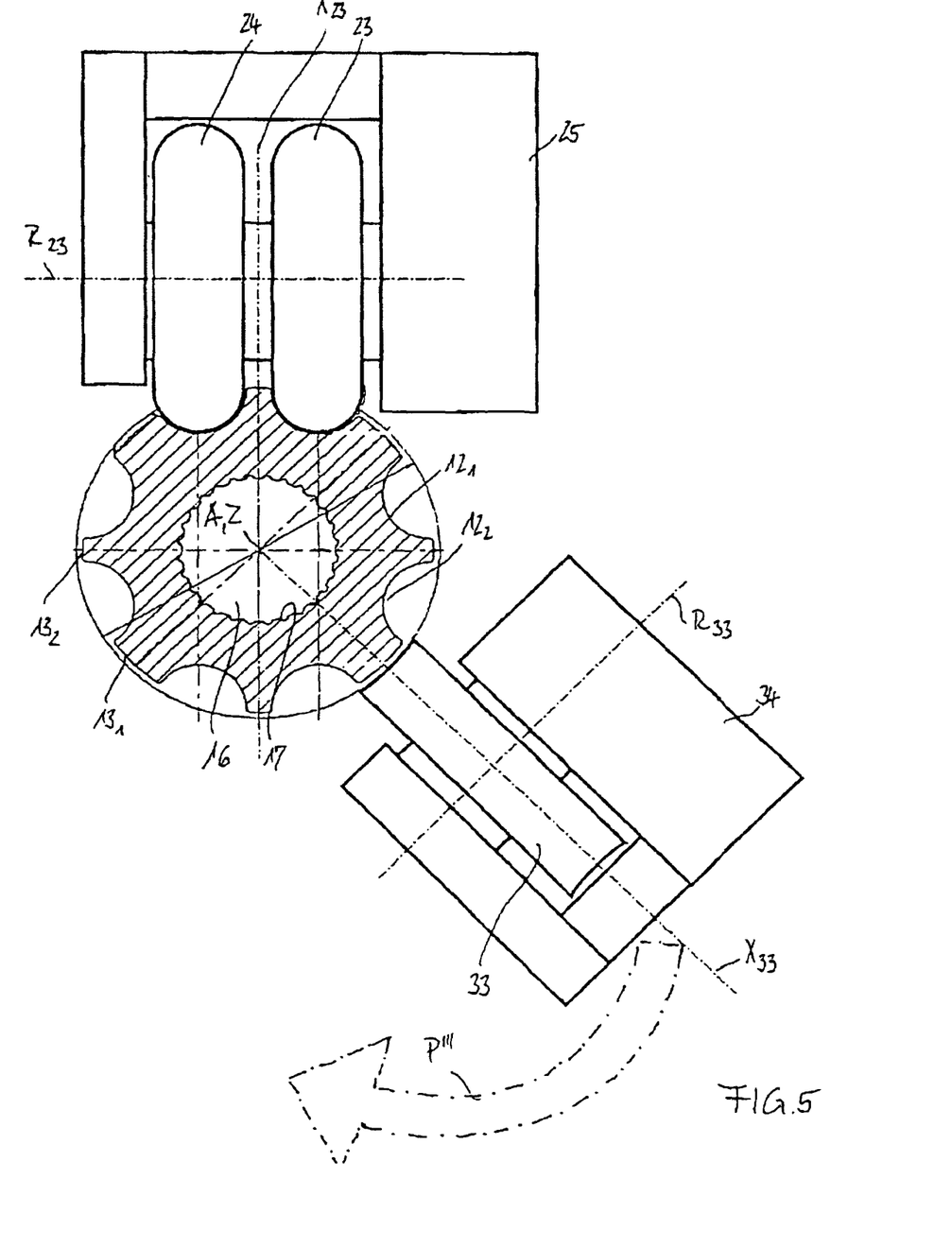
FIG. 5 shows the execution of an inventive process wherein two parallel ball tracks and one web face are machined simultaneously.

FIG. 5 shows a further embodiment of an inventive process, wherein the inner joint part 11 comprises ball tracks $12_1$, $12_2$ which extend in pairs arranged in parallel relative to one another and which form first wider web regions $13_1$ positioned between two pairs and second narrower web regions $13_2$ positioned between the two tracks $12_1$, $12_2$ of a pair. In this case, the tracks $12_1$, $12_2$ of a pair are machined by two rotating tools 23, 24 which comprise a common axis of rotation $R_{23}$ and are rotatingly drivably held in a common holding device 25. The holding device 25 and thus the tools 23, 24 move radially relative to the longitudinal axis A of the inner joint part and to the clamping axis Z in the direction of the radial ray $X_{23}$. The web regions $13_1$, $13_2$ are each machined by a rotating tool 33 which comprises an axis of rotation $R_{33}$ and is rotatingly drivably received in a holding device 34. The holding device 34 and thus also the tool 33 again move radially relative to the longitudinal axis A of the inner joint part 11 and thus to the clamping axis in the direction of the radial ray $X_{33}$. In this case, too, the axes $R_{32}$, $R_{33}$ are preferably positioned in a common plane, A dash-dotted arrow P'''' indicates that the holding device 34 is additionally adjustable relative to the holding device 25 so that the holding device 34 can be adjusted from machining the web region $13_1$ (as illustrated) to machining the web region $13_2$ around the center of movement A without there being a need to rotate the workpiece around the clamping axis. Only after the operation of machining two web regions $13_1$, $13_2$, which takes place at least partially simultaneously with the machining of the tracks $12_1$, $12_2$, has been completed, is the workpiece 11 rotated around its clamping axis by the pitch angle between the pairs of tracks, i.e. in this case by 90°. The holding device 34 is pivoted back into its starting position. Alternatively, with the workpiece 11 being held in a fixed position, it is possible for both holding devices 25, 34 to be adjusted jointly relative to the fixed workplace 11 around the center of movement A.

Modifications of the above-described process are possible, for example by additionally providing two tools for simultaneously machining two web regions, but which two tools have to comprise different axes of rotation.

What is claimed is:

1. A process of machining inner joint parts of constant velocity universal ball joints, which inner joint parts comprise a longitudinal axis (A) and at least one guiding face by which the inner joint part is orbitally angularly movably guided in a ball cage, and which comprise a plurality of ball tracks which are distributed around the circumference of the guiding face and which ball tracks divide the guiding face into a corresponding plurality of guiding webs and in which ball tracks torque transmitting balls can be held so as to be longitudinally displaceable, comprising, simultaneously machining one ball track and at least one guiding web.

2. A process according to claim 1, wherein with uneven numbers of ball tracks and guiding webs, one ball track and one radially opposed guiding web each are machined simultaneously.

3. A process according to claim 1, wherein, with even numbers of ball tracks and guiding webs, one ball track and one guiding web adjoining the radially opposed ball track are each machined simultaneously.

4. A process according to claim 1, wherein two ball tracks and two guiding webs are each machined simultaneously.

5. A process according to claim 1 comprising simultaneously machining in the longitudinal direction synchronously, two ball tracks positioned in planes extending parallel relative to one another, and machining at least one guiding web at least partially simultaneously therewith.

6. A process according to claim 5, wherein two ball tracks positioned in planes extending parallel relative to one another are machined by jointly driven tools.

7. A process according to claim 1, wherein the ball tracks are machined by rotating tools whose axes of rotation (R) perpendicularly cross the longitudinal axis (A) of the inner joint part and whose center is guided in radial planes (X) which, relative to the inner joint part, extend through the longitudinal axis (A).

8. A process according to claim 1, wherein the ball tracks are machined by rotating tools whose axis of rotation extends substantially radially relative to the longitudinal axis (A) of the inner joint part, wherein the axis of rotation, relative to the inner joint part, is guided in radial planes extending through the longitudinal axis (A) of the inner joint part.

9. A process according to claim 1, wherein the guiding webs are machined by rotating tools whose axis of rotation (R) perpendicularly crosses the longitudinal axis (A) of the inner joint part and whose center is guided in radial planes which, relative to the inner joint part, extend through the longitudinal axis (A).

10. A process according to claim 9, wherein the guiding webs are machined by rotating tools whose center, relative to the inner joint part, additionally pivots around its longitudinal axis (A).

11. A process of machining inner joint parts of constant velocity universal ball joints, which inner joint parts comprise a longitudinal axis (A) and are provided with at least one guiding face by which the inner joint part is orbitally angularly movably guided in a ball cage, and which comprise a plurality of ball tracks which are distributed around the circumference of the guiding face, which ball tracks divide the guiding face into a corresponding number of guiding webs and in which ball tracks torque transmitting balls are held so as to be longitudinally displaceable, comprising, simultaneously machining at least two guiding webs in the longitudinal direction.

12. A process according to claim 11, wherein, with uneven numbers of ball tracks and guiding webs, a first ball track or web face and the second ball track or guiding web adjoining the radially opposed web face or ball track are each machined simultaneously.

13. A process according to claim 11, wherein, with even numbers of ball tracks and guiding webs, two radially opposed ball tracks or guiding webs are each machined simultaneously.

14. A process according to claim 11, wherein the ball tracks are machined by rotating tools whose axes of rotation (R) perpendicularly cross the longitudinal axis (A) of the inner joint part and whose center is guided in radial planes (X) which, relative to the inner joint part, extend through the longitudinal axis (A).

15. A process according to claim 11, wherein the guiding webs are machined by rotating tools whose axis of rotation (R) perpendicularly crosses the longitudinal axis (A) of the inner joint part and whose center is guided in radial planes which, relative to the inner joint part, extend through the longitudinal axis (A).

* * * * *